United States Patent
Hess (10) Patent No.: US 10,472,214 B2
(45) Date of Patent: Nov. 12, 2019

(54) CRANE AND METHOD FOR MONITORING THE OVERLOAD PROTECTION OF SUCH A CRANE

(71) Applicant: Liebherr-Werk Biberach GmbH, Biberach an der Riss (DE)

(72) Inventor: Alfred Hess, Gutenzell-Hürbel (DE)

(73) Assignee: Liebherr-Werk Biberach GmbH, Biberach an der Riss (DE)

( * ) Notice: Subject to any disclaimer, the term of this patent is extended or adjusted under 35 U.S.C. 154(b) by 246 days.

(21) Appl. No.: 15/673,196

(22) Filed: Aug. 9, 2017

(65) Prior Publication Data
US 2017/0334686 A1   Nov. 23, 2017

Related U.S. Application Data

(63) Continuation of application No. PCT/EP2016/000173, filed on Feb. 3, 2016.

(30) Foreign Application Priority Data

Feb. 9, 2015   (DE) .................... 20 2015 001 024 U (51) Int. Cl.
*B66C 23/90* (2006.01)
*B66C 13/16* (2006.01)
(Continued)

(52) U.S. Cl.
CPC ............ *B66C 23/905* (2013.01); *B66C 13/16* (2013.01); *B66C 15/065* (2013.01); *G01L 5/0071* (2013.01); *G01L 5/101* (2013.01)

(58) Field of Classification Search
CPC ..... B66C 23/905; B66C 13/16; B66C 15/065; G01L 5/0071; G01L 5/101
See application file for complete search history.

(56) References Cited

U.S. PATENT DOCUMENTS

| 4,752,012 A * | 6/1988 | Juergens ............... B66C 23/905 212/277 |
| 2016/0341193 A1* | 11/2016 | Du .......................... F04B 51/00 |
| 2017/0144872 A1* | 5/2017 | Holmberg ............... B63B 21/16 |

FOREIGN PATENT DOCUMENTS

| CN | 1139413 | 1/1997 |
| DE | 10127403 | 12/2002 |

(Continued)

*Primary Examiner* — Michael E Gallion
(74) *Attorney, Agent, or Firm* — Levine Bagade Han LLP (57) ABSTRACT

The present invention relates to a crane having a boom at which at least one load receiving means is arranged in a raisable and lowerable manner, wherein an overload protection device has detection means for detecting the outreach and the load on the at least one load receiving means, and wherein a monitoring device for monitoring the overload protection device is provided and has determination means for determining a tensioning force holding the boom and/or induced in a guy cable. The invention furthermore also relates to a method for monitoring the overload protection device of such a crane. Provision is made in accordance with the invention that the monitoring device determines online in crane operation a tensioning torque from the continuously determined tensioning force, determines a lifting torque from the continuously detected outreach and the continuously detected load, determines a dead torque while making use of stored crane data, compares the sum of the named lifting torque and the named dead torque with the named tensioning torque and then, if a difference found in the comparison exceeds a tolerance threshold, emits an error signal and/or shutdown signal.

7 Claims, 5 Drawing Sheets

(51) Int. Cl.
 *B66C 15/06* (2006.01)
 *G01L 5/00* (2006.01)
 *G01L 5/10* (2006.01)

(56) References Cited

FOREIGN PATENT DOCUMENTS

| | | |
|---|---|---|
| EP | 0667315 | 8/1995 |
| JP | 2000-191286 | 7/2000 |
| JP | 3281481 | 5/2002 |
| JP | 2008-110825 | 5/2008 |
| JP | 4224929 | 2/2009 |
| WO | WO 2016/128119 | 8/2016 |

\* cited by examiner

FIG. 1

$F_N$: Tension in neck cable (resulting from useful load + cable weight)
$F_A$: Force application due to dead load of boom
$F_{G+S}$: Force application due to useful load + cable weight
$F^*_{G+S}$: Force application due to useful load + cable weight on fly jib (only optional)

$l_N$: Lever arm for torque from tension in neck cable
$l_A$: Lever arm for torque from dead load of boom
$l_{G+S}$: Lever arm for torque from useful load + cable weight
$l_{FJ}$: Lever arm for torque from useful load + cable weight on fly jib (only optional)

$$F_N \times l_N = F_A \times l_A + F_{G+S} \times l_{G+S} + (F^*_{G+S} \times l_{FJ})$$

FIG. 2 (Part 1 of 2)

FIG. 2 (Part 2 of 2)

FIG. 3

CRANE AND METHOD FOR MONITORING THE OVERLOAD PROTECTION OF SUCH A CRANE

CROSS-REFERENCE TO RELATED APPLICATIONS

This application is a continuation of International Application No. PCT/EP2016/000173, filed Feb. 3, 2016, which claims priority to German Utility Model No. 20 2015 001 024.5, filed Feb. 9, 2015, issued May 10, 2016, both of which are incorporated by reference herein in their entireties.

BACKGROUND

1) Technical Field

The present invention relates to a crane having a boom at which at least one load receiving means is arranged in a raisable and lowerable manner, wherein an overload protection device has detection means for detecting the outreach and the load on the at least one load receiving means, and wherein a monitoring device for monitoring the overload protection device is provided and has determination means for determining a tension force holding the boom and/or induced in a guy cable. The invention furthermore also relates to a method for monitoring the overload protection device of such a crane.

2) Description of the Related Art

The crane strain on cranes such as construction cranes, for example mobile construction cranes, revolving tower cranes or needle boom cranes having luffable booms is typically monitored by means of a crane control or by means of an overload protection device implemented therein as to whether a critical load limit is reached so that the crane is at risk of falling over or is endangered in another manner in order then to switch off the corresponding drive devices of the crane in good time as required. Such an overload protection device in this respect typically works with stored load curves that indicate the permitted load for a respective outreach, with the actual outreach and the actual load being detected at the crane by means of sensors and being compared with the load for the respective outreach permitted by the stored load curve. If the actual detected load state approaches the load curve or if the latter is reached or even exceeded, the crane drives are switched off or at least slowed down by the overload protection device and/or a corresponding warning signal is indicated. The actual load can in this respect, for example, be determined from the hoist cable tension while taking account of the reeving, for example by means of a lifting force sensor indicating the drive force of the hoist cable winch or also by means of force sensors associated with deflection rollers or pulley blocks. The outreach, that is the horizontal distance from an assumed tilt axis, in particular from the articulation axis or luffing axis of the boom, can be determined in different manners in dependence on the crane type, for example by means of a positional sensor that indicates the position of a trolley cable winch, or by means of an angular position encoder that indicates the setting angle of the boom or by means of other suitable outreach sensors, with a plurality of such sensors or detection means also being able to be provided in combination with one another.

Such an overload protection device can, however, only work safely and reliably if the named detection means actually detect the outreach and the load correctly and precisely and do not deliver any incorrect values. It can, however, occur in rough crane operation that angle sensors, for example, that are intended to detect the boom setting angle slip or that the load detection means incorrectly detect the actual load because they start from an incorrect cable reeving. If, for example, the lifting hook is operated with a double reeving, but the overload protection device only assumes a simple reeving, double the load is actually suspended at the lifting hook than is indicated by the load detection means. As a consequence of such errors, the overload protection device would start from incorrect values of the actual outreach and/or the actual load so that the stability of the crane can be at risk despite a comparison with the permitted load value for the corresponding outreach in accordance with the stored load curve.

To prevent such malfunctions, it has already contemplated to monitor the overload protection device by a monitoring device and for this purpose to see whether a tensioning force actually induced into the guy cable of the boom corresponds to the expected tensioning force that is to be expected due to the overreach values and load values indicated by the sensors or by the detection means of the overload protection device. For this purpose, the tensioning force measured during a scaling procedure can be associated with the detected load values and outreach values and can be compared therewith so that a conclusion on a malfunction of the overload protection device can be made with differences that are too great. Such a scaling procedure with a comparison of the inducted tensioning force with the load values and outreach values detected by the overload protection device is, however, relatively complex and cannot really preclude malfunctions with sufficient precision and safety in the event of changes only occurring in crane operation.

SUMMARY

It is therefore the underlying object of the present invention to provide an improved crane and an improved method for monitoring the overload protection device that avoid the disadvantages of the prior art and further develop the latter in an advantageous manner. A precise and permanently reliable monitoring of the overload protection device and of its load detection means and outreach detection means should in particular thereby be provided without complex scaling procedures.

In accordance with the invention, the named object is achieved by a crane in accordance with claim 1 and by a method in accordance with claim 7. Preferred embodiments of the invention are the subject of the dependent claims.

It is therefore proposed also to take account of the dead torque arising due to the weight of the boom and optionally of further crane components on a comparison of the torques that act in mutually opposite senses on the crane or boom and also to carry out the torque comparison continuously in crane operation as a background monitoring. Provision is made in accordance with the invention that the monitoring device determines online in crane operation a tensioning torque from the continuously determined tensioning force, determines a lifting torque from the continuously detected outreach and the continuously detected load, determines a dead torque while making use of stored crane data, compares the sum of the named lifting torque and the named dead torque with the named tensioning torque and then, if a difference found in the comparison exceeds a tolerance threshold, emits an error signal and/or shutdown signal. If the evaluation unit determines that the tensioning torque calculated by the torque calculator does not agree with the sum of the lifting torques and dead torques acting in an opposite sense or if it differs too much therefrom, it can be assumed that something is not right with the sensor system or with the detection means of the overload protection device that detect the load and outreach or that the overload protection device is calculating incorrectly. The named tolerance threshold can in this respect be suitable fixed to take account of variable secondary loads such as wind forces, subsequently attached advertising signs at the boom or other interference parameters such as typical measurement tolerances.

The monitoring can take place much more precisely and exactly by the taking into account also of the dead torque of the boom and of attachment parts optionally attached thereto such as a trolley cable, additional pulley blocks or a boom extension in the form of a fly jib and even smaller errors, for example due to a slipping of angle sensors, can already be noticed, with a more complex scaling procedure no longer being compulsory and with the operator no longer having to configure any special parameters on a scaling, i.e. a setting of the crane due to the determination of the dead torque with the aid of stored crane data. The data required for the monitoring can be uploaded semi-automatically or fully automatically in the background on the setup of the crane.

In a further development of the invention, a crane having a luffable boom and the angle detector of the overload protection device provided for determining the boom setting angle can in particular also be monitored using the named monitoring device. The named angle detector can in this respect generally be differently configured, can, for example, be an angle position encoder that is attached in the region of the luffing axis of the boom. Alternatively or additionally, a drum position sensor and/or a drive position sensor can also be provided as an angle detector that is associated with a retraction mechanism and/or that detects the position of the guy cable and/or of the guy rods for the boom and thus the boom setting angle.

The boom setting angle determined with the aid of the named setting angle or luffing angle detector is in this respect advantageously taken into account both on the determination of the lifting torque and on the determination of the dead torque since a change of the boom setting angle can influence both the outreach of the load receiving means and the lever arm or the outreach of the center of gravity of the boom dead mass. The monitoring device or its torque calculator can calculate the previously named dead torque with reference to the stored crane data that can comprise the boom weight, the boom length, the position of center of gravity and/or the center of gravity spacing from the luffing axis of the boom while taking account of the named boom setting angle or boom luffing angle. By taking account of the boom luffing angle, it is in particular also possible to consider the circumstance that the lever arm of the dead mass and thus the dead torque becomes smaller as the boom is set increasingly steeper. In a similar manner, the torque calculator can also take account of the setting angle for the lifting torque since the lever arm or the outreach of the load receiving means and thus the resulting lifting torque becomes smaller as the boom becomes increasingly steeper.

In a further development of the invention, the boom setting angle determined by the named angle detector or luffing angle encoder can, however, not only be taken into account in the calculation of the dead torque and of the lifting torque, but also in the calculation of the tensioning torque rotating in the opposite direction since the effective lever arm of the guying is typically also changed by adjusting the boom setting angle.

The monitoring device or its torque calculator advantageously calculates a lever arm of the tensioning force on the boom, the outreach of the at least one load receiving means, and the lever arm of the dead load of the boom from the respectively determined boom setting angle or luffing angle to then, while additionally considering the respectively determined tensioning force, the respectively determined load, and the stored boom dead weight, calculate the torques rotating clockwise and anti-clockwise and to compare them with one another.

If the crane has more than one load receiving means, for example in the form of a first lifting hook that runs from a main part of the boom or from a trolley and of a second lifting hook that runs from a boom extension or a so-called fly jib, respective individual levers arms can be determined or outreaches considered for the plurality of load receiving means to determine the respective generated lifting torques precisely.

In the named determination of the lever arms of the tensioning force, of the at least one load receiving means, and of the dead load, the monitoring device can advantageously assume that the lever arm can be related to a common tilt axis. The monitoring device can in particular relate all the lever arms of the tensioning forces, lifting forces and dead lifting forces to the luffing axis of the boom, whereby a simple and nevertheless sufficiently precise torque calculation can be achieved. The calculation model used for this purpose that the monitoring device uses is hereby considerably simplified without losing any precision.

However, in general different or other tilt axes can be looked at for the torque calculation, for example the base point of the tower of a revolving tower crane or a support point of an undercarriage disposed beneath the boom. The aforesaid calculation of the lever anus with respect to the luffing axis of the boom, however, noticeably simplifies the torque calculation.

The aforesaid determination means for determining the tensioning force holding the boom or induced in the guy cable can generally be of different design. In an advantageous further development of the invention, for example, a force transmitter can be associated with the neck cable or with the neck guy rods that hold the boom to measure the tensioning force directly. Alternatively or additionally, at least one force transmitter can also be associated with a tensioning strut or tensioning support, for example in the form of a tower tip over which the guy cable construction runs to detect reaction forces in the tensioning support induced by the guy cable or guy rods. Alternatively or additionally, force transmitters and/or extension transmitters and/or bending deformation transmitters can be associated with a structural part of the crane that undergoes a corresponding deformation by the tensioning force. For example, with a revolving tower crane in the form of a top-slewer, the bending torque introduced into the tower or the bending load and/or extension load resulting in the tower is detected that is a measure for the tensioning torque or reaction torque counter-acting the lifting torques and dead torques.

The tensioning force used in the context of the present invention can to this extent mean the force directly induced in a guy cable or holding the boom or also a reaction force associated therewith that occurs in a structural part of the crane and is a measure for the tensioning torque or reaction torque counter-acting the lifting torques and dead torques.

BRIEF DESCRIPTION OF THE DRAWINGS

The invention will be explained in more detail in the following with respect to preferred embodiments and to associated drawings. There are shown in the drawings.

DETAILED DESCRIPTION

Figure 1:
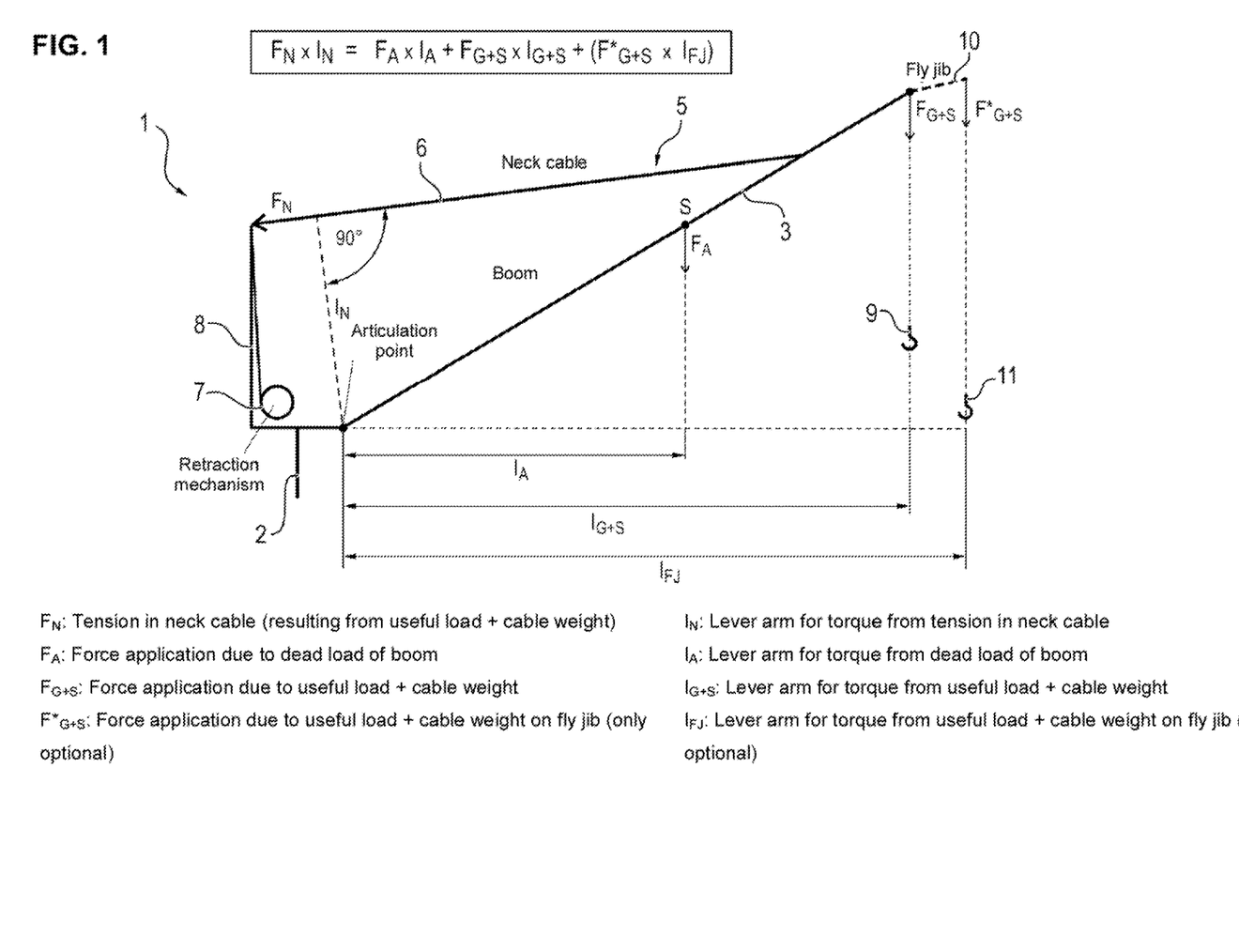
FIG. 1: a schematic sectional representation of a revolving tower crane having a luffable boom and a boom extension attached to the boom in the form of a fly jib as well as of the forces and torques engaging at the boom.

As FIG. 1 indicates, the crane 1 can be configured as a construction crane or as a revolving tower crane that comprises a tower 2 that can be supported on a slewing deck 3 that can be seated on an undercarriage and can be slewed about a upright axis of rotation. On a design as a top-slewer, the named tower 2 can, however, also be anchored in a rotationally fixed manner. The aforesaid undercarriage can be configured as a truck, a crawler-mounted vehicle or travelable in another manner, but can also be a fixedly anchored or fixedly supported support base.

The named tower 2 can carry a boom 3 that can be luffed up and down about a horizontal luffing axis 4 that can extend at the base of the boom 3 or between the tower 2 and the boom 3. On configuration as a top-slewer, the boom 3 can additionally be rotated about the tower 2 about an upright axis, in particular about the longitudinal tower axis.

The named boom 3 is tensioned via a guy cable 5, with the named guy cable 5 being able to have a neck cable 7 adjustable by a retraction mechanism 7 to be able to adjust, preferably continuously, the luffing angle or the setting angle of the boom 3. The named neck cable 7 can in this respect be guided or deflected via a tower tip 8 that is only indicated, but with other support struts also alternatively or additionally being able to be provided and in particular guy rods being able to be provided instead of a guy cable.

As FIG. 1 shows, a hoist cable having a load receiver (e.g., lifting hook 9) connected in an articulated manner thereto can run out over a corresponding deflection roller in the region of the boom tip, with the named lifting hook 9 or the hoist cable connected thereto also being able to be guided over a trolley that can be traveled along the boom 3 in a manner known per se.

As FIG. 1 further shows, a boom extension 10 can attached to the boom 3 in the form of a fly jib, with a further load receiving means in the form of a load receiver (e.g., lifting hook 11) being able to run off said fly jib at a corresponding hoist cable.

As FIG. 1 illustrates, a plurality of useful and dead lifting forces act on the boom 3 that have different lever arms and that exert torques on the boom 3 rotating clockwise in accordance with FIG. 1. The lifting hooks 9 and 11 running off the boom 3 or the boom extension 10 pull the boom 3 downwards clockwise in accordance with FIG. 1, with the forces $F_{G+S}$ and $F^*_{G+S}$ each resulting from the useful load fastened to the lifting hook 9 and 11 and from the cable and from the hook weight. The horizontal outreach of the named forces $F_{G+S}$ and $F^*_{G+S}$ determines their lever arm $I_{G+S}$ and $I_{FJ}$ with respect to the luffing axis 4 of the boom 3 that can be considered a tilt axis.

The dead load of the boom 3 furthermore attempts to pull this boom 3 downward clockwise with the force $F_A$ in accordance with FIG. 1, with the named dead load being able to be composed of the weight of the boom 3, the weight of the fly jib or of the boom extension 10, and additional components optionally attached thereto such as a trolley cable, deflection rollers, floodlights, winches, adjustment actuators and other attachments. The dead lifting force $F_A$ representing the dead load can in this respect be considered as engaging at the center of gravity S, cf. FIG. 1. The named dead loads or weight forces and the geometry of the boom including the distance of the center of gravity S from the luffing axis 4 can be stored in the form of crane data in a memory 12 of the crane control 13.

On the other hand, the tensioning force $F_N$ engages at the named boom 3 that is applied by the aforesaid neck cable of the guy cable 5 and that attempts to pull the boom 3 upwards counter-clockwise in accordance with FIG. 1.

The named tensioning force $F_N$ in this respect has the lever arm $I_N$ that can be seen in FIG. 1 and that forms a straight line through the luffing axis 4 perpendicular to the neck cable 7.

To hold the boom 3 in equilibrium, the sum of all the torques rotating clockwise has to correspond to the sum of all the torques rotating counter-clockwise. With respect to the previously explained forces and torques, this means that the tensioning torque has to correspond to the sum of the lifting torques due to the lifting hooks 9 and 11 and the dead load torque as a result of the tensioning force $F_N$ as the following equation expresses:

$$F_N \times I_N = F_A \times I_A + F_{G+S} \times I_{G+S} + F^*_{G+S} \times I_{FJ}$$

As can be seen from FIG. 1, the named lever arms $I_A$, $I_{G+S}$ and $I_{FJ}$ of the useful loads and dead loads and also the lever arm $I_N$ of the tensioning force $F_N$ are influenced by the luffing angle or by the setting angle of the boom 3, with the named lever arms $I_A$, $I_{G+S}$ and $I_{FJ}$ of the dead loads and useful loads changing a lot more on angle changes of the setting angle of the boom 3 than the lever arm $I_N$ of the tensioning force $F_N$, at least in the typical setting angle ranges of the boom 3 that can extend between a horizontal orientation of the boom 3 and an orientation of the boom facing upwards at an acute angle to the vertical. The smaller influencing of the lever arm $I_N$ of the tensioning force $F_N$ is substantially due to the geometry of the tensioning since the tensioning angle of the neck cable 6 with respect to the boom 3 is comparatively slightly adjusted on a luffing of the boom 3 when the boom 3 has, in a typical manner, a rather large length in relation to the height of the tower tip.

Figure 4:
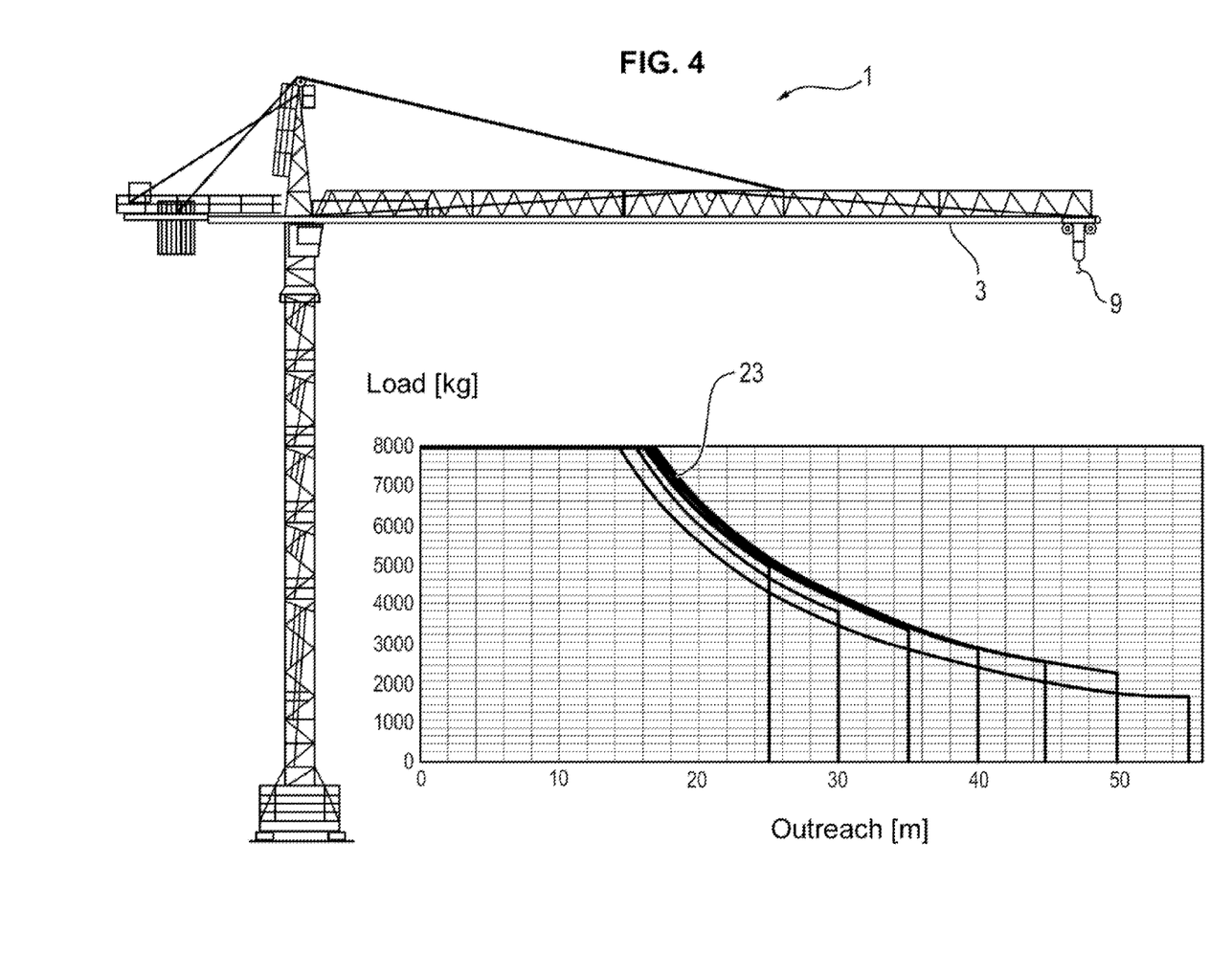
FIG. 4: a load curve of the overload protection device for a revolving tower crane with a horizontal luffing position of the boom.

An overload protection device 14 implemented in the crane control 13 determines by suitable detection means 15 and 16 the outreach of the useful loads $F_{G+S}$ and $F^*_{G+S}$ as well as the named useful loads themselves. For this purpose, an angle encoder 17 can detect the luffing angle or setting angle of the boom 3 so that the outreach, i.e. the named lever arms $I_{G+S}$ and $I_{FJ}$, can be determined via the stored crane geometry or boom geometry data. If a trolley is travelable at the boom 3, a trolley position encoder can additionally be provided. On the other hand, the hoist cables leading to the lifting hooks 9 and 11 can be provided with lifting force encoders 18 that can be associated with the cable winch drives or deflection roller suspensions to determine the hoist cable forces. The named overload protection device 14 can carry out a comparison from the correspondingly determined load values and outreach values with one or also more load curves that can be stored in the memory of the crane control 13. FIG. 4 shows such a stored load curve 23 by way of example.

To be able to monitor the function of the named overload protection device 14 in the background, a monitoring device 19 is furthermore provided that calculates the useful load torques and dead load torques acting on the boom 3 from the previously named useful loads and dead loads $F_{G+S}$, $F^*_{G+S}$ and $F_A$ and the associated outreach values or lever arms $I_{G+S}$, $I_{FJ}$ and $I_A$. These useful load torques and dead load torques all act clockwise in accordance with FIG. 1 and FIG. 2.

Figure 2:
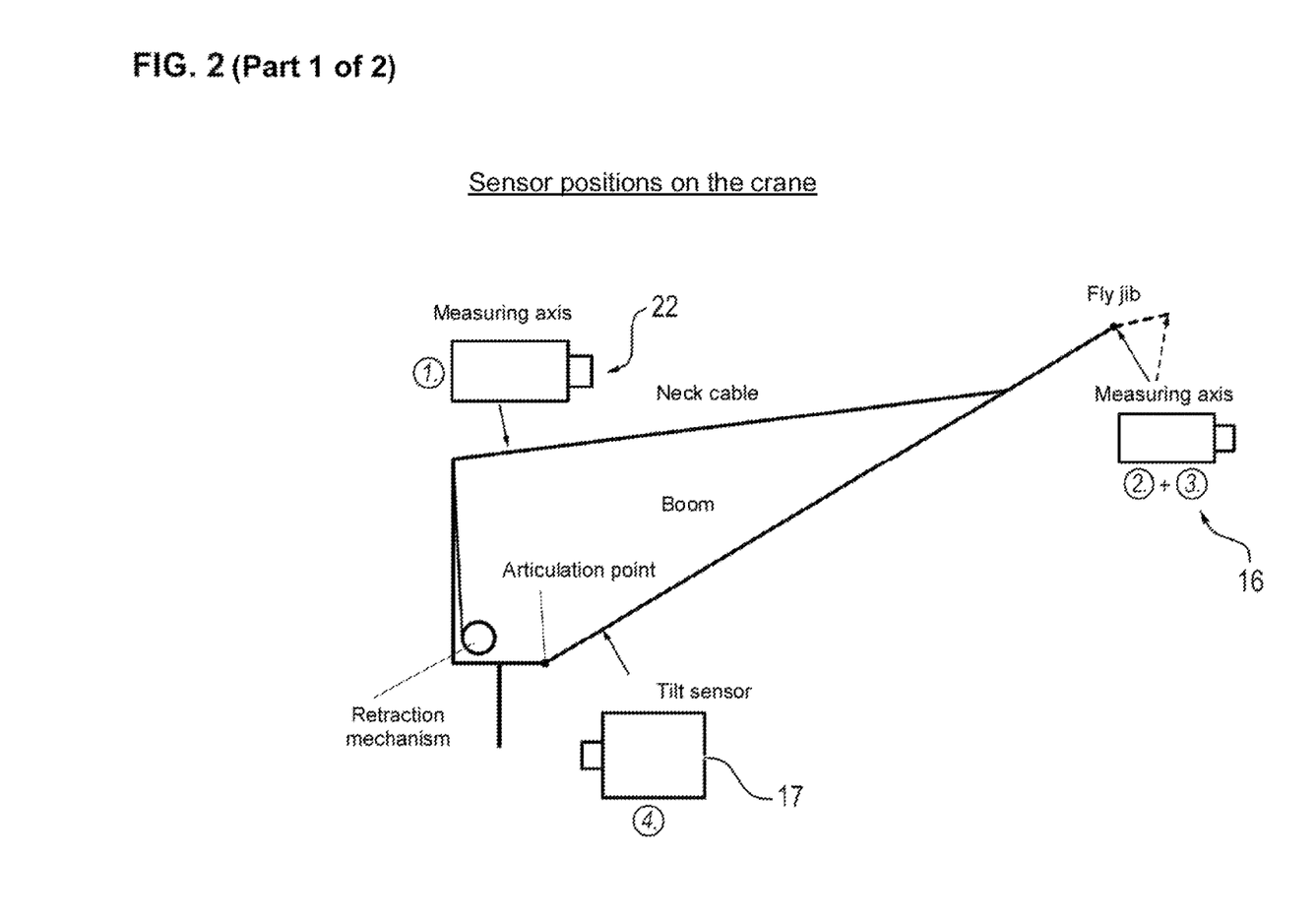
FIG. 2: a data flowchart to illustrate the determination of the load and outreach values and the lever arm values, the torque calculation derived from this, and the comparison of the torques rotating clockwise with the torques rotating anti-clockwise.

On the other hand, the named monitoring device 19 or the torque calculator 20 implemented therein calculates the tensioning torque that acts on the boom 3 counter-clockwise in accordance with FIG. 1 and FIG. 2 and that results from the tensioning force $F_N$ and from the associated lever arm $I_N$. As previously explained, the setting angle of the boom 3 that is measured by the named angle encoder 17 is taken into account in the torque calculation, more precisely in the determination of the lever arms.

An evaluation unit 21 of the monitoring device 19 then compares the named tensioning torque rotating counter-clockwise with the sum of the lifting torques and dead load torques rotating clockwise, cf. FIG. 2. More precisely, the named evaluation unit 21 determines the difference between the said tensioning torque rotating counter-clockwise and the sum of the lifting torques and dead load torques rotating clockwise. If the resulting difference exceeds a specific tolerance threshold, the evaluation unit 21 concludes from this that the overload protection device 14, in particular its detection means 15 and 16, is not working properly.

The evaluation unit 21 can, on the one hand, output an error message in such a case, which can be output at a display device in the crane cabin and/or at a display apparatus at the radio terminal. On the other hand, the evaluation unit 21 can also output a shutdown signal to switch off actuating drives, in particular a main hoist mechanism drive and/or a fly jib winch drive and/or a retraction mechanism drive.

The named tolerance threshold serves to take account of interference parameters such as wind forces, subsequently attached advertising signs at the boom or other interference parameters and can be stored in the form of a fixed, predetermined threshold value in the memory 12 of the crane control 13. Alternatively or additionally, the named tolerance threshold value can also be adapted to resulting interference parameters, for example in dependence on a wind measurement signal, in particular such that the tolerance threshold is lowered when there is no wind or little wind and the tolerance threshold is increased as the wind becomes increasingly greater and stronger. An adaptation of the tolerance threshold in dependence on other influence parameters is conceivable.

As FIG. 2 shows, the monitoring device 19 can determine the tensioning force $F_N$ by means of a force transmitter 24 or can detect it by a sensor, with the said force transmitter 24 being able to be directly associated with the guy cable 5 or the neck cable 6. For example, the force transmitter 24 can detect the winch torque of the retraction mechanism 7 on which the neck cable 6 is wound.

Figure 3:
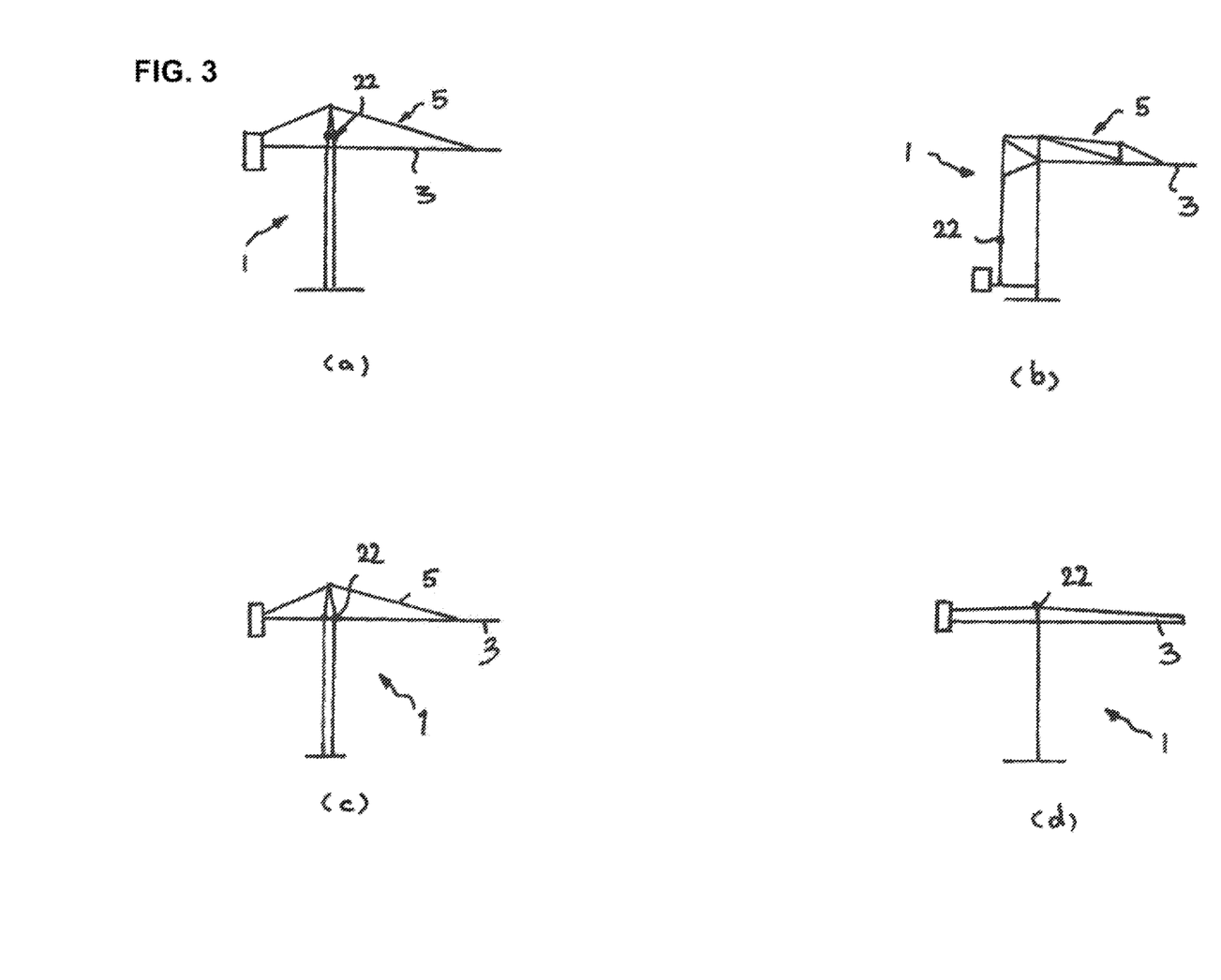
FIG. 3: a schematic representation of different crane types and of the attachment possibilities of the determination means for determining the tensioning force induced by useful loads and dead loads.

As FIG. 3 shows, the reaction force or tensioning force induced by the boom 3 and useful loads and dead loads acting thereon or the corresponding reaction torque can also be detected by other determination means 22. Alternatively or additionally to the aforesaid force transmitter 24, the named determination means 22 can, for example, have a force and/or torque detector 25 that detects the force and/or torque reactions induced by the guy cable in a tensioning strut, for example in a tower tip 8, cf. FIG. 3(*a*). For example, torque measurement units or strain gauges associated with the force transmitter or struts or structural parts of the tower tip 8 can be associated with the bearing pins or bearing axes of the tower tip 8.

As FIG. 3(*b*) shows, the determination means 22 for determining the aforesaid tensioning force can also be associated with the vertical tensioning part that leads to the superstructure or to the ballast at the base of the tower 2.

As FIG. 3(*d*) shows, the tensioning force in a revolving tower crane without a tower tip can be also be detected by the determination means in the form of the tension in the top chord.

I claim:

1. A crane comprising:
   a boom;
   at least one load receiver having a raisable and lowerable configuration;
   an overload protection device comprising a detector for detecting the outreach and the load on the at least one load receiver; and
   a monitoring device for monitoring the overload protection device comprising a determiner for determining a tensioning force holding the boom and/or induced in a guy cable;
   wherein the monitoring device is configured to:
      determine online in crane operation a tensioning torque from the determined tensioning force,
      determine a lifting torque from the detected outreach and the detected load,
      determine a dead torque while making use of stored crane data,
      compare the sum of the lifting torque and the dead torque with the tensioning torque, and
      then, if a difference of the tensioning torque from said sum of lifting torque and dead torque exceeds a tolerance threshold, emit an error signal and/or shutdown signal.

2. The crane of claim 1, wherein the boom is luffably supported about a horizontal luffing axis and the detector of the overload protection device for detecting the outreach have a luffing angle encoder for determining a boom luffing angle or boom setting angle, wherein the monitoring device is configured such that the boom setting angle determined by the luffing angle encoder is taken into account both on the determination of the lifting torque and of the dead torque and on the determination of the tensioning torque.

3. The crane of claim 2, wherein a lever arm of the tensioning force on the boom, the outreach of the at least one load receiver, and the lever arm of a dead lifting force of the boom can be calculated by the monitoring device from the boom setting angle determined by the luffing angle encoder.

4. The crane of claim 3, wherein the monitoring device is configured such that the lever arm of the tensioning force, the outreach of the at least one load receiver and the lever arm of the dead lifting force of the boom is related to a common tilt axis, in particular the luffing axis of the boom, and/or is calculated with respect to the tilt axis.

5. The crane of claim 1, wherein the determiner for determining the tensioning force comprises a force transmitter for detecting the tension force in a neck cable or in neck rods and/or is associated with neck cable or neck rods.

6. The crane of claim 1, wherein the stored crane data comprise a boom weight and/or a boom extension weight and/or a boom length and/or a boom extension length and/or the distance of the center of gravity of the boom from a boom luffing axis and/or the distance of the center of gravity of a boom extension from the boom luffing axis.

7. A method of using an overload protection device of a crane to monitor a load, comprising:
- detecting a useful load acting on at least one load receiver and the outreach of the at least one load receiver using a detector;
- comparing the useful load with a permitted load value for the respective outreach from a stored load curve;
- emitting a warning signal upon a reaching or exceeding of the permitted load value and/or switches off and/or slows down a crane drive;
- monitoring of the overload protection device for correct function, wherein the monitoring is by a monitoring device;
- continuously determining a tensioning torque from an operation of the crane by the monitoring device from a continuously determined tensioning force;
- determining a lifting torque from the detected outreach and from the detected useful load;
- determining a dead torque from stored crane data;
- calculating the difference between the determined tensioning torque and the sum of the lifting torque and the dead torque; and
- emitting an error signal and/or shutdown signal upon an exceeding of a tolerance threshold by the difference.

* * * * *